United States Patent [19]

Meyst et al.

[11] 4,283,289

[45] Aug. 11, 1981

[54] BLOOD FILTER FOR LEUKOCYTES

[75] Inventors: Richard P. Meyst, Crystal Lake; Ronald M. Porten, Mundelein, both of Ill.

[73] Assignee: Baxter Travenol Laboratories, Inc., Deerfield, Ill.

[21] Appl. No.: 68,829

[22] Filed: Aug. 22, 1979

[51] Int. Cl.³ .................... B01D 27/06; B01D 39/08
[52] U.S. Cl. .................... 210/448; 210/450; 210/456; 210/927
[58] Field of Search ....... 210/456, 450, 448, DIG. 23, 210/23 R, 505, 927

[56] References Cited

U.S. PATENT DOCUMENTS

| 768,951 | 8/1904 | Rawson | 210/448 |
|---|---|---|---|
| 2,068,837 | 1/1937 | Aronson | 210/164 |
| 2,576,864 | 11/1951 | Valente | 210/204 |
| 2,598,818 | 6/1952 | Muirhead | 210/448 X |
| 2,644,586 | 7/1953 | Cutter | 210/164 |
| 3,246,767 | 4/1966 | Pall et al. | 210/505 |
| 3,261,473 | 7/1966 | Riede | 210/282 |
| 3,448,041 | 6/1969 | Swank | 210/DIG. 23 |
| 3,462,361 | 8/1969 | Greenwalt et al. | 210/23 |
| 3,511,382 | 5/1970 | Meser | 210/489 |
| 3,593,854 | 7/1971 | Swank | 210/436 |
| 3,701,433 | 10/1972 | Krukauer et al. | 210/436 |
| 3,902,746 | 9/1975 | Brandt | 210/448 X |
| 3,935,111 | 1/1976 | Bentley | 210/446 |
| 3,954,623 | 5/1976 | Hammer et al. | 210/448 |
| 4,017,279 | 4/1977 | Bowley | 55/87 |
| 4,035,304 | 7/1977 | Watanabe | 210/317 |
| 4,038,194 | 7/1977 | Luceyk et al. | 210/DIG. 23 X |
| 4,046,696 | 9/1977 | Muuwen | 210/431 |
| 4,056,476 | 11/1977 | Muuwen | 210/446 |
| 4,073,723 | 2/1978 | Swank et al. | 210/DIG. 23 |
| 4,087,363 | 5/1978 | Rosemeyer | 210/448 X |
| 4,126,559 | 11/1978 | Cooper | 210/448 X |

FOREIGN PATENT DOCUMENTS

| 877475 | 8/1971 | Canada | 210/427 |
|---|---|---|---|
| 1928052 | 12/1970 | Fed. Rep. of Germany | 210/927 |
| 1242493 | 11/1971 | United Kingdom | 210/927 |

Primary Examiner—Frank A. Spear, Jr.
Attorney, Agent, or Firm—Paul C. Flattery; Garrettson Ellis

[57] ABSTRACT

A leukocyte filter for blood which includes a housing defining a blood inlet and outlet at respective ends thereof, with the housing enclosing and carrying a tubular, non-woven fiber filter element, with one of the inlet and outlet communicating with the interior of the tubular filter element, and the other of the inlet and outlet communicating with the exterior of the tubular filter element. In the tubular filter element, essentially all of the fibers define diameters of 10 to 100 microns, and have other diameter restrictions described herein, with the fibers being bonded together to define a generally fixed, average interstitial spacing which is less at the inner surface of the tubular filter element than at the outer surface thereof. The air permeability of the filter per square foot is preferably from essentially 15 to 45 SCFM at one half inch of water.

12 Claims, 3 Drawing Figures

U.S. Patent    Aug. 11, 1981    4,283,289
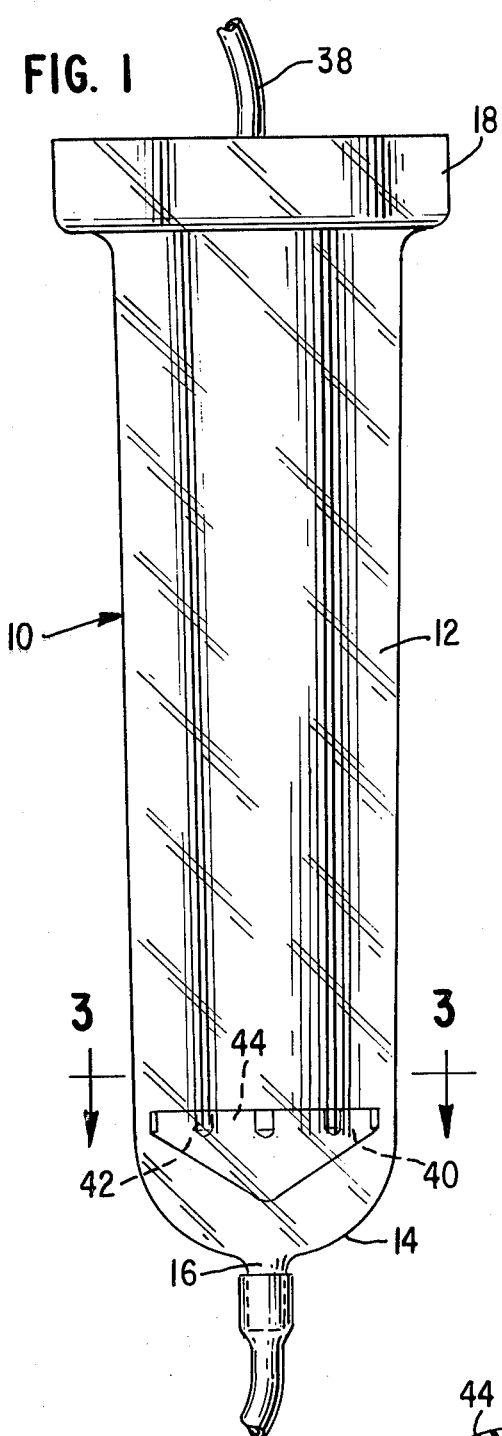
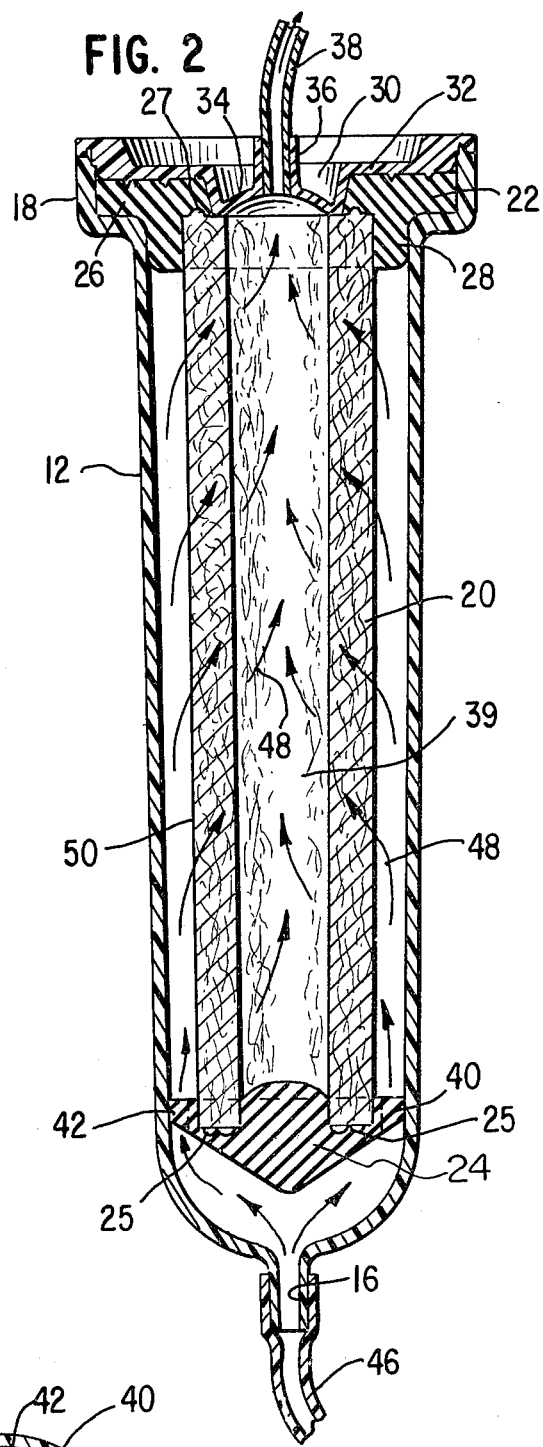
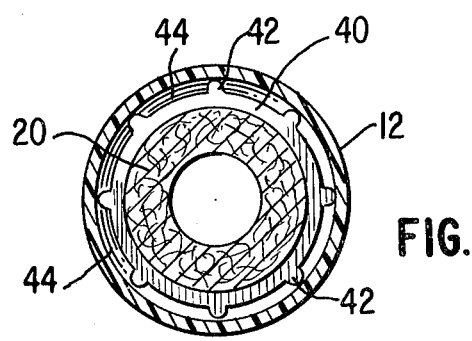

BLOOD FILTER FOR LEUKOCYTES

BACKGROUND OF THE INVENTION

A technique for the collection of leukocytes, and particularly granulocytes, has been developed which involves passing blood through a non-woven fibrous material in which the diameters of the fibers are, in the main, less than 100 microns. See, for example, Swank U.S. Pat. Nos. 3,448,041 and 3,593,854, and Greenwalt, et al. U.S. Pat. No. 3,462,361. The filter members in each of these patents disclose means for collecting leukocytes and particularly granulocytes.

It has been found that the leukocytes may be eluted from the filter, from where they may then be collected and then administered to a patient in need of white cell therapy.

The LP-1 filter sold by Travenol Laboratories, Inc. is used to harvest and then elute leukocytes from a donor, for administration to a patient or the like.

This filter has a tubular housing with some flexibility, with the result that a certain amount of a shunting of blood can take place between the mass of filtration fibers in the filter and the housing.

Another blood filter which uses non-woven fibers is disclosed in our previous patent applications, Ser. No. 816,987, filed July 19, 1977, now U.S. Pat. No. 4,157,967, and Ser. No. 803,696, filed June 6, 1977.

A white cell donor may donate his cells by having blood from his system passed through a non-woven, fibrous white cell collection filter directly from his bloodstream, and then returning the filtered blood to his bloodstream containing the majority of the red cells, but with most of the granulocytes retained on the filter. After the donation process is complete, the filter may be washed free of red cells, and then the granulocytes may be harvested by elution from the filter.

By this invention, an improved filter for the collection of leukocytes and particularly granulocytes is disclosed. The filter of this invention provides a very low mortality of the red cells and platelets, which only have to pass through a relatively thin amount of non-woven fibrous material in their path through the device of this invention, while flowing from one veinous puncture site to another veinous puncture site of a white cell donor.

The design of the cartridge and the composition of the non-woven fiber arrangement is adapted for optimum performance in the collection and harvesting of viable leukocytes, while avoiding red cell and platelet mortality. Also, the filter of this invention is adapted for enhanced removal of healthy leukocytes from the filter surfaces, as well as having improved characteristics in the collection of the white cells. The white cells are also in better condition for not having to pass through a large, thick section of filter material, but instead are collected at areas near the surface of the high area filter of this invention, to avoid the stress that can be created by being forced through an extensive, thick filter. The filter of this invention allows a uniform flow of fluid, thereby increasing the accessability of leukocytes to all fiber surface areas.

The filter of this invention is also advantageous for sterilization purposes, since its high surface area reduces the time required to sterilize the filter with ethylene oxide gases, and then to dissipate the gases from the filter.

Also, the problems of shunting and clogging of the filter are reduced. The large surface area permits a low fluid velocity through the filter media for a maximum cell residence time, coupled with a minimal pressure differential. This increases the yield of granulocytes, for example, on a generally consistent basis, and also increases the viability of the red and other cells.

DESCRIPTION OF THE INVENTION

The leukocyte filter for blood, and specifically a granulocyte filter, comprises a housing defining a blood inlet and outlet at respective ends thereof, with the housing enclosing and carrying a tubular, non-woven fiber filter element with one of the inlet and outlet communicating with the interior of the tubular filter element, and the other of the inlet and outlet communicating with the exterior of the filter element.

In accordance with this invention, essentially all of the fibers define diameters of 10 to 100 microns. From 10 to 70 percent by weight of the fibers define fiber diameters of 10 to 20 microns, and at least 50 percent by weight of the fibers have diameters of no more than 35 microns.

The fibers are bonded together to define a generally fixed, average, interstitial spacing, which is less at the inner surface of the tubular filter element than at the outer surface thereof.

The air permeability of the filter (per square foot) is from essentially 15 to 45 standard cubic feet per minute (SCFM) at one half inch of water as measured by a Frazier Air Permeability Measuring Machine, available from the Frazier Precision Instrument Company of Gaithersburg, Maryland.

Preferably, the filter element defines a total surface area of its fibers available for adsorption of leukocytes of 30,000 to 70,000 square centimeters, for a high capacity of leukocyte collection.

The filter element may be retained in the housing at both ends by first and second silicone rubber retention members, or other equivalent material having the excellent hemocompatibility of silicone rubber. The first retention member also defines a housing end seal, and further defines its aperture for one of the inlet or outlet. The second retention member defines a seal of the bore of the tubular filter element, and defines, at its periphery, a plurality of spaced, peripheral ribs engaging the inner wall of the housing and defining flow channels between the ribs. The ribs are compressed by the inner wall to insure a seal between the filter element and the second retention member.

It is also preferred for the ends of the filter element to be integrally attached to and commingled with the first and second silicone rubber retention members.

The fibers of the filter elements utilized in this invention are bonded together with a suitable hemocompatible binder, for example, a self-cross linking resin binding. The fibers may further be mechanically interlocked by a needle-punch technique to stabilize the configuration of the fibers in the filter element.

Accordingly, the bonding of the fibers and the physical stabilization of the bundle by mechanical interlocking with a needle-punch, results in a filter element having interstices of controlled size, for precision filtration and improved harvesting and elution characteristics.

By this invention, a non-shunting leukocyte filter for blood is provided, having interstices of generally controlled size, for predictable and high yields of collected leukocytes and particularly granulocytes.

In the drawings, FIG. 1 is an elevational view of a leukocyte filter in accordance with this invention.

FIG. 2 is a longitudinal sectional view of the leukocyte filter of this invention.

FIG. 3 is a transverse sectional view of the leukocyte filter of this invention, taken along line 3—3 of FIG. 1.

Referring to the drawings, leukocyte filter 10 comprises a tubular housing 12 which may preferably be of rigid, transparent or opaque plastic, defining a generally closed end 14 terminating in a rigid tubular aperture portion 16 which may be integral with housing 12. At its other end, an enlarged, open sleeve 18 is provided to receive the closure.

Positioned within a housing 12 is tubular, non-woven fiber filter element 20 which is secured at its respective ends by first silicone rubber retention member 22 and second silicone rubber retention member 24. Silicone rubber retention member 22 defines a flange 26 which rests in the enlarged portion defined by sleeve 18. First retention member 22 also defines a depending sleeve 28 surrounding the upper end of filter element 20, plus an aperture 30, as shown in FIG. 2.

Outer closure 32 fits on top of silicone rubber retention member, and defines a central seal portion 34 with a tubular aperture 36 for receiving a flexible tube 38, for communication with the interior or bore 39 of tubular filter element 20. Accordingly, the upper end, as shown in FIG. 2, of filter element 20 and housing 12 are sealed by members 22 and 32, except for flow through flexible tubing 38, which may serve as a blood outflow line for connection to a veinous puncture needle for return of the blood to the donor.

Second retention member 24 defines a seal of the bore 39 of filter element 20, and also defines an annular peripheral portion 40 surrounding the lower end of filter element 20, as shown in FIG. 2.

Peripheral portion 40 in turn defines peripheral ribs 42 engaging the inner wall of housing 12 and defining flow channels 44 between the ribs, as shown in FIG. 3. Ribs 42 are compressed by the inner wall to insure the seal between the filter element 20 and the second retention member 24.

It is preferred for each end of the filter element 20 to be integrally attached to and commingled with the first and second silicone rubber retention members 22, 24. This can be accomplished by preforming the filter element, and then molding retention members 22, 24 in place out of room temperature vulcanizing silicone rubber stock about the ends of filter element 20, so that the uncured, plastic silicone rubber stock can enter into intimate, commingling contact with the fibrous ends of the filter element 20, flowing at least to some extent into the interstices of the fibers at the ends, for a firm bond between the retention members 22, 24 and the filter member 20.

Alternatively, the premolded members 22, 24 may be attached to and commingled with filter member 20 by an adhesive such as silicone RTV, with the cured RTV material becoming part of members 22, 24. In this instance, the silicone rubber retention member 24 may define annular grooves 25 for receiving and holding excess silicone RTV sealant which is used to adhere retention member 24 to the filter member 20.

The RTV sealant can enter into intimate, commingling contact with the fibrous ends of filter element 20. In the same manner, a single annular groove 27 is defined in retention member 22 at the upper end of filter 20 for the same purpose of receiving excess RTV material, for improved bonding characteristics between retention member 22 and filter 20.

As shown, blood from a patient can enter flexible inlet tubing 46 through tubular inlet 16, then passing upwardly as shown in FIG. 2 through apertures 44, around the second retention member 24. The blood then runs along the outside of filter element 20, passing through the filter element as shown by arrows 48 into the bore 39 of the filter element. From there, it can pass outwardly from the other end of the filter element 20 to tubing 38 for return to the patient in the most common mode of use. It is also contemplated that other modes of use, for example filtration of stored blood and the like, are possible as well as utilizing filter 10 in a shunting blood circuit connected to a patient.

In a shunting blood circuit, conventional roller pump means may be used to impel the blood through the filter 10, connected to conventional equipment for establishing the connection with the blood circuit of the patient.

Filter element 20 may comprise polyester fibers made from a polyester material such as Dacron which is available from the DuPont Chemical Company. Specifically, a blend of fibers as follows is a preferred blend: 40 percent by weight of fibers having diameters of about 12.5 microns; 30 percent by weight of fibers having diameters of about 17.6 microns; and 30 percent by weight of fibers having diameters of about 25 microns.

However, any blood-compatible, synthetic or natural fiber may be utilized as a substitute for polyester fibers, for example, polyamide fibers such as nylon, vinylic polymer fibers such as polypropylene, polyethylene, or polyacrylate fibers; cellulosic fibers such as rayon or cotton; animal fibers such as wool or silk, or inorganic fibers such as glass.

The fibers may be crimped or textured to provide loft if desired, and are blended to form a homogeneous texture.

The fibers may then be mechanically interlocked by a conventional needle-punching technique to provide a bat or felt which has a thickness of 0.2 to 0.6 inch, for example, 0.39 inch, and a weight per unit area of 18 to 70 ounces per square yard, for example 43 ounces.

Thereafter, the felt may be formed into a tubular cartridge with an inner diameter of 0.75 inch and an outer diameter of 1⅜ inches. The inner diameter may be as small as 0.25 inch and as large as 10 inches, while the outer diameter may be as small as 0.49 inch and as large as 11 or 12 inches. In the event where the inner and outer diameters are extremely large, the cartridge might be in a tubular shape of very short length, to balance off its wide width. Preferably, however, the specific filter element contemplated may have a length of 6 inches, plus or minus about five inches.

The resulting tubular filter element exhibits the advantage of having interstices between the fibers which are smaller on the wall surface which defines bore 39 than on the wall surface which defines outer wall 50, as a result of the process of rolling up of the filter member. This provides the desirable gradation in the filter extending from the outer surface to the inner surface of filter element 20.

Following this, the lattice structure which is formed in the filter element with fixed interstitial spacing may be permanently maintained by treating the tubular filter element 20 with a blood-compatible bonding agent for adherence of various fibers together at their junctions. Specifically, the use of a self-cross linking acrylic resin binder with a high compression modulus is desirable for forming the three dimensional stable fibrous matrix, for example, Rhoplex HA16 from the Rohm and Haas Company, applied as a five percent dispersion in water.

The resulting fiber element preferably defines fluid pathways through its interstices large enough to allow free passage of erythrocytes. At the same time, the pathways through the interstices permit the adsorption of granulocytes, while preventing undesirably high pressure gradients during operation. Specifically, the total surface area of the filter element available for adsorption may be about 50,000 square centimeters, with the permeability of the whole cartridge as measured by the Frazier Air Permeability Measuring Machine being 30 SCFM at one half inch of water.

The above has been offered for illustrative purposes only, and is not intended for the purpose of limiting the invention of this application, which is as defined in the claims below.

That which is claimed is:

1. In a leukocyte filter for blood a housing defining a blood inlet and an outlet at respective ends thereof, said housing enclosing and carrying a tubular, non-woven fiber filter element with one of said inlet and outlet communicating with the interior of said tubular filter element, and the other of said inlet and outlet communicating with the exterior of said tubular filter element, the improvement comprising, in combination:

said tubular fiber filter element constituting a depth filter having a thickness of 0.2 to 0.6 inch, essentially all of said fibers defining diameters of 10 to 100 microns, from 10 to 70 percent by weight of said fiber defining fiber diameters of from 10 to 20 microns, and at least 50 percent by weight of said fibers having diameters of no more than 35 microns, said fibers being bonded together to define a generally fixed average interstitial spacing which is less at the inner surface of said tubular filter element than at the outer surface thereof, the air permeability of one square foot of said filter being from essentially 15 to 45 SCFM at ½ inch of water.

2. The filter of claim 1 in which said filter element defines a total surface area of its fibers available for adsorption of 30,000 to 70,000 sq. cm.

3. The filter of claim 2 in which the filter element is retained in said housing at both ends by first and second silicone rubber retention members, the ends of said filter element being integrally attached to and commingled with said first and second silicone rubber retention members, said first retention member also defining a housing end seal and further defining an aperture for one of said inlet and outlet; said second retention member defining a seal of the bore of said tubular filter element and defining about its periphery a plurality of spaced, peripheral ribs engaging the inner wall of said housing and defining flow channels between said ribs, said ribs being compressed by said inner wall to ensure the seal between said filter element and the second retention member.

4. The filter of claim 3 in which said fibers of said filter element are bonded together with a self-crosslinking acrylic resin binder.

5. The filter of claim 4 in which said fibers of the filter element are mechanically interlocked by a needle punch technique.

6. The filter of claim 5 in which the wall of said filter element has a weight of 18 to 70 ounces per square yard.

7. In a white cell filter for blood a housing defining a blood inlet and an outlet at respective ends thereof, said housing enclosing and carrying a tubular, non-woven fiber filter element with one of said inlet and outlet communicating with the interior of said tubular filter element and the other of said inlet and outlet communicating with the exterior thereof, said filter element defining fiber diameters adapted to adsorb and temporarily hold white cells from blood passing therethrough, the improvement comprising, in combination:

said fiber filter element having a thickness of 0.2 to 0.6 inch, said fibers being bonded together to define a generally fixed average interstitial spacing which is gradated in size to be less at the inner surface of said tubular filter element than at the outer surface thereof, and in which said filter element is retained in said housing at both ends by first and second blood-compatible, elastomeric retention members, the ends of said filter element being integrally attached to and commingled with said retention members, said first retention member also defining a housing end seal and further defining an aperture for one of said inlet and outlet, said second retention member defining a seal of a bore of said tubular filter element and defining about its periphery a plurality of spaced, peripheral ribs engaging the inner wall of said housing and defining flow channels between said ribs, said ribs being compressed by said inner wall to insure the seal between the seal of said filter element and the second retention member.

8. The filter of claim 7 in which said fibers of the filter element are mechanically interlocked by a needle-punch technique.

9. The filter of claim 8 in which the wall of said filter element has a weight of 18 to 70 ounces per square yard.

10. The filter of claim 9 in which said filter element defines a total surface area of its fibers available for adsorption of 30,000 to 70,000 square centimeters.

11. The filter of claim 10 in which the air permeability of said filter per square foot is from essentially 15 to 45 SCFM at one half inch of water.

12. The filter of claim 11 in which said fibers of said filter element are bonded together with a self-cross linking acrylic resin binder.

* * * * *